United States Patent [19]

Kunz

[11] 4,280,577

[45] Jul. 28, 1981

[54] TEMPERATURE-PROTECTED WEIGHING APPARATUS WITH BEARING ENCLOSURE

[75] Inventor: Peter Kunz, Gossau, Switzerland

[73] Assignee: Mettler Instrumente AG, Greifensee, Switzerland

[21] Appl. No.: 151,981

[22] Filed: May 21, 1980

[30] Foreign Application Priority Data

Aug. 28, 1979 [CH] Switzerland .................. 7783/79

[51] Int. Cl.³ .................. G01G 21/02; G01G 7/00
[52] U.S. Cl. ................................. 177/179; 177/212
[58] Field of Search ............... 177/179, 210 EM, 212

[56] References Cited

U.S. PATENT DOCUMENTS

| 3,084,753 | 4/1963 | Hendon | 177/212 X |
| 4,109,738 | 8/1978 | Kunz | 177/212 |
| 4,148,370 | 4/1979 | Luchinger et al. | 177/210 EM |
| 4,184,556 | 1/1980 | Kunz | 177/212 X |

FOREIGN PATENT DOCUMENTS 2749953 6/1978 Fed. Rep. of Germany .......... 177/212

*Primary Examiner*—George H. Miller, Jr.
*Attorney, Agent, or Firm*—Laubscher & Laubscher

[57] ABSTRACT

Weighing apparatus of the electromagnetic load compensation type is disclosed including a pivoted transmission lever that connects the compensation coil for movement relative to the stationary permanent magnet field in accordance with the displacement of the load receiving assembly from its initial no-load position, characterized in that the transmission lever is connected with the load receiving assembly via a flexible bearing contained within a hollow coupling part of the load receiving assembly, thereby protecting the bearing against the deleterious influence produced by the different heating rates of the various structural components. By protecting the flexible bearing against component-generated heat as well as extreme variations in ambient temperature, the zero or no-load operating point of the weighing apparatus is protected against temperature-produced errors.

6 Claims, 4 Drawing Figures

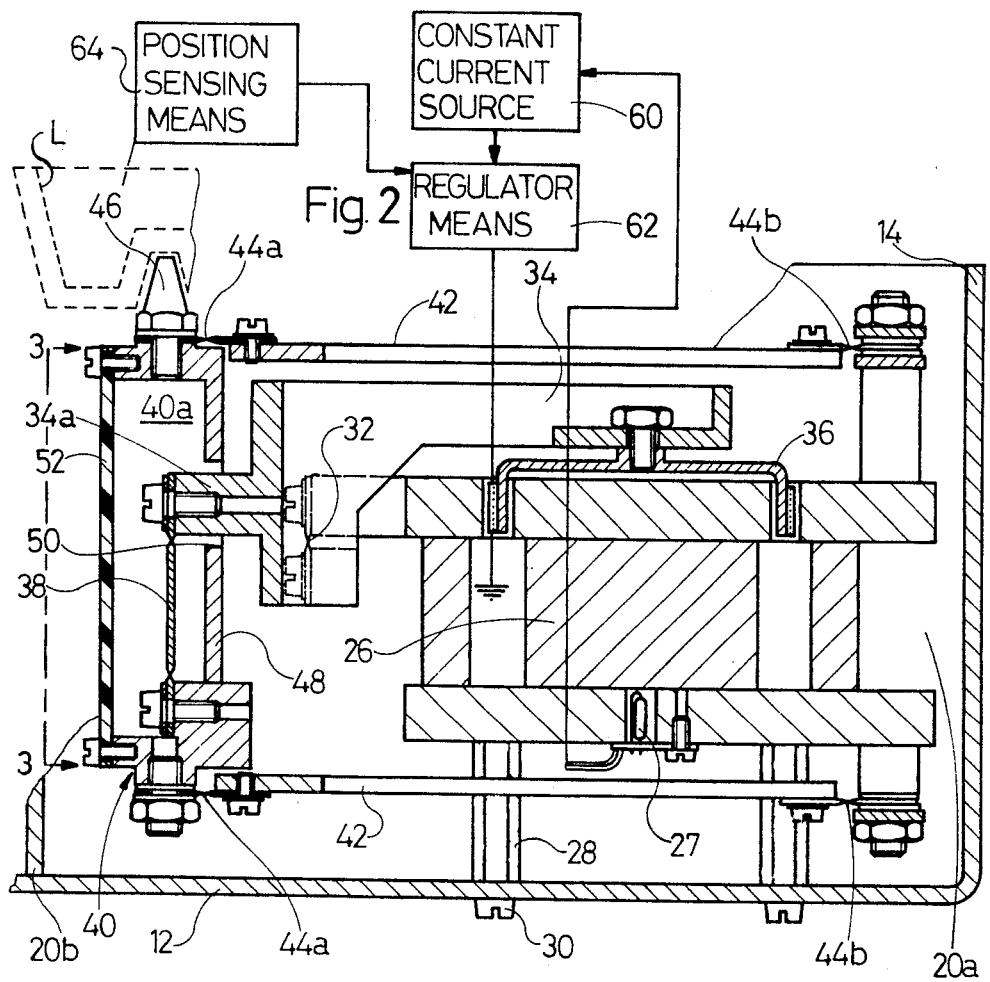
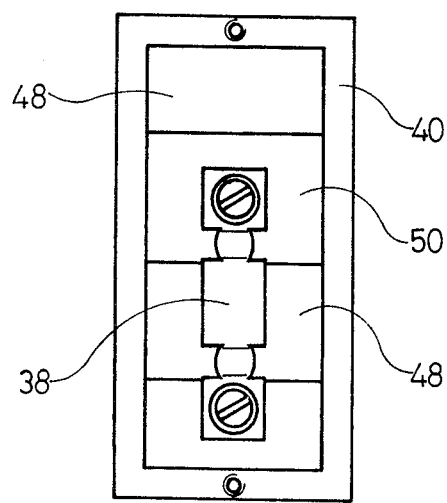

TEMPERATURE-PROTECTED WEIGHING APPARATUS WITH BEARING ENCLOSURE

BRIEF DESCRIPTION OF THE PRIOR ART

An improved weighing apparatus of the electromagnetic load compensation type is disclosed similar to those of the patents to Kunz U.S. Pat. Nos. 3,786,678, 3,786,883, 4,109,738 and 4,184,556, Baumgartner U.S. Pat. No. 3,677,357, Strobel U.S. Pat. No. 3,688,854 and Baumann et al U.S. Pat. No. 3,816,156, among others.

As shown, for example, in the Kunz U.S. Pat. No. 4,109,738, it is conventional in such weighing systems to provide a pivotally connected transmission lever which supports the electromagnetic compensation coil for movement relative to the permanent magnet means in accordance with the displacement of the load receiving assembly from its initial no-load (i.e., null or zero point) position. Position sensing means serve to regulate the amount of current supplied to the compensation coil as a function of the extent of displacement of the load receiver means from its no-load position, whereby a restoring force is generated which returns the load receiver to the no-load position, the magnitude of the compensation current being a function of the load applied to the load receiver means. The transmission lever is generally connected with the load receiver means via a vertically arranged elastic support bearing, and often a temperature-sensing resistor may be provided adjacent the electromagnetic compensation means to afford temperature compensation for the system.

Scales of this kind, frequently also referred to as compact scales, offer the great advantage of a space-saving design; all required components are placed in the same housing, as distinguished from the more expensive scales were the control portions with the dial and most of the electrical components are placed in a separate housing.

When electrical components having a small power loss are used, the effect of the temperature on the null or zero point and the sensitivity of the scale remain problematical; likewise, in the case of higher-resolution scales. A certain compensation of temperature influences is achieved in the known manner by using a heat sensor arranged in a compensation system for sensing the temperature changes occurring in the permanent magnet system, thereby to influence, for example, the compensation current source. But that does not take into consideration all disturbing influences as yet. In addition to the previously indicated heat transfer by the electrical components itself, the time curve of the temperature at the individual places in the scale plays an essential role. Thus the temperature gradients which arise in the area of the lever bearing influence, for example, the magnitude, the direction, and the course of the zero point drift (i.e., the actuation performance of the scale). Of course, while it would in any case be theoretically possible to reduce these error influences by using additional heat detectors, this would cause relatively complicated additional circuits and associated expenditures that would generally be too great.

SUMMARY OF THE INVENTION

The primary object of the present invention is to provide, in compact scales of the type described above, improved temperature performance, in a simple manner, and in particular to optimize the turn-on performance through a reduction of temperature-responsive zero-point errors. According to the invention, to solve this problem it has been proposed that the elastic support bearing be placed within the coupling member (which is at least partly made hollow). By means of this solution, it is possible to harmonize the temperature-conditioned expansion of the elastic bearing and the coupling member, as distinguished from the prior art systems in which the bearing was in each case placed outside the coupling member (in other words, it was also freely exposed to heat radiation and convection from the environment). It thus became heated up considerably faster, and it therefore stretched more than the coupling member, so that there were relative position changes which undesirably appeared in the dial indication as zero-point errors. With the help of the improved apparatus of the invention, both components are heated up in the inverse sequence, thereby substantially producing an even longitudinal stretch.

The desired effect can be further improved if a removable cover member is provided, whereby the coupling member becomes a completely closed container. This means that the previously still open front of the coupling member has been closed, and the elastic bearing is even better protected against premature heating. The cover member can, for example, be screwed on or clamped on. Preferably the cover member is formed of synthetic plastic material.

According to a more specific object of the invention, partition means are provided on the housing for defining separate compartments in one of which is arranged the permanent magnet means, the compensation coil and the temperature sensing means, and in the other of which is arranged the electrical components of the weighing system. With the help of this partition, one can achieve a further improvement in the temperature performance of the system. Here it is particularly desirable that the partition be formed integral with the lower portion of the housing.

BRIEF DESCRIPTION OF THE DRAWING

Other objects and advantages of the invention will become apparent from a study of the accompanying sheets of drawing, in which:

FIG. 2 is a longitudinal sectional view of the weighing apparatus of the present invention;

FIG. 3 is a detailed end view of the coupling member taken along line 3—3 of FIG. 2, the cover plate being removed.

DETAILED DESCRIPTION

Figure 1:
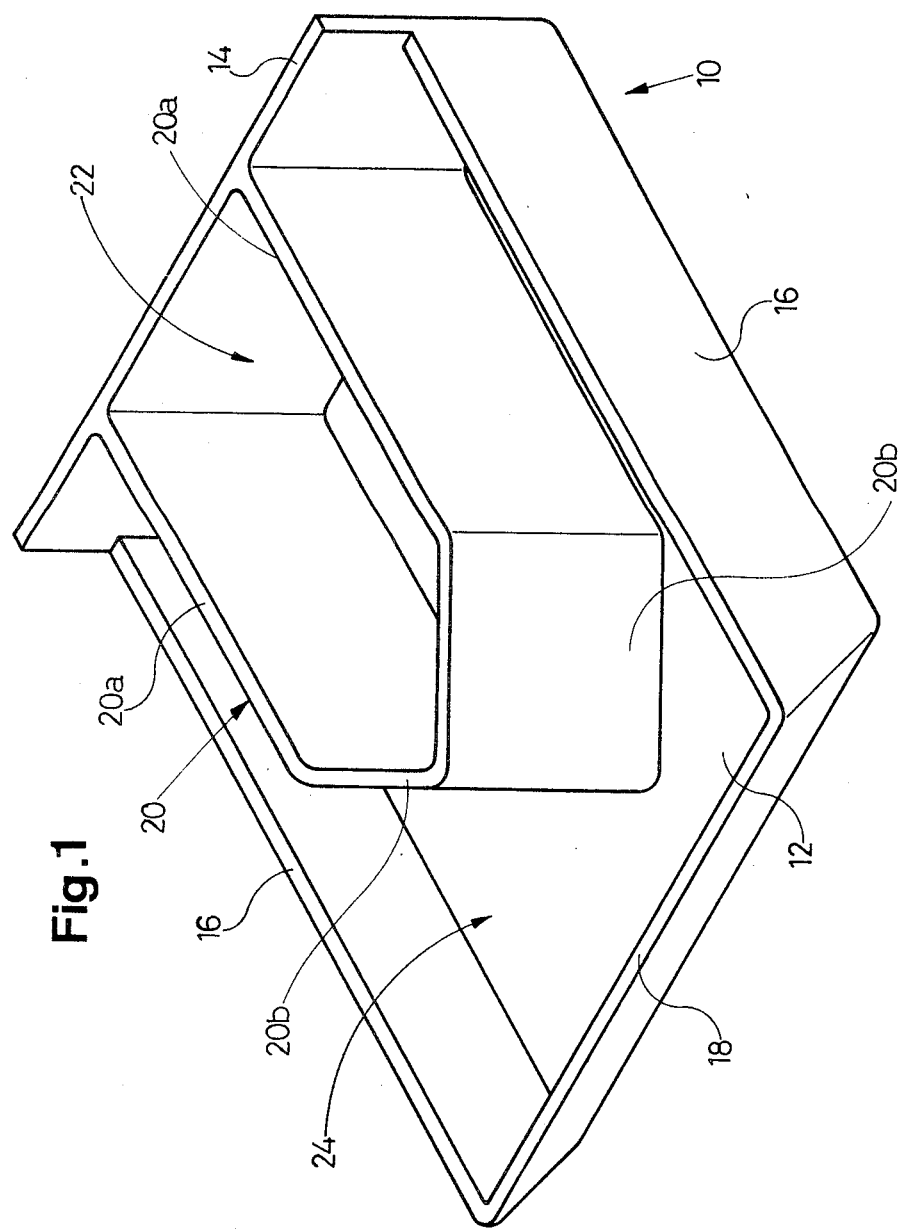
FIG. 1 is a perspective view of the housing of the weighing apparatus of the present invention.
Figure 4:
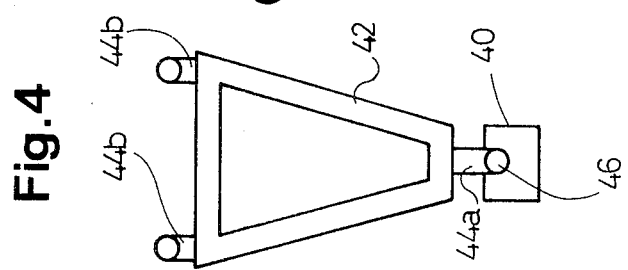
FIG. 4 is a detailed top plan view of the coupling guidance means.

Referring first more particularly to FIG. 1, the scale housing 10 comprises a light-metal molded part formed, for example, by means of a pressure-casting method. The housing includes a bottom wall 12, a rear wall 14, two side walls 16, and an inclined front wall 18. The rear wall 14 is substantially higher than the remaining wall portions. A cover (not shown) shaped in a manner complementary to the chassis 10 is adapted for placement on the chassis to enclose the scale, thereby forming a two-part housing.

The housing 10 further includes a partition 20 having a pair of parallel side walls 20a, and a forward V-shaped portion having converging side walls 20b. The partition side walls have the same height as the rear wall. The resultant open-topped chamber 22 defined within the partition walls is adapted to receive the weighing cell which will be described further on. The hollow space 24, located outside chamber 22, serves to receive electrical circuits, the dial, and additional components, which are made in the conventional manner and which therefore are not illustrated.

The weighing cell shown in profile in FIG. 2 corresponds to the one disclosed in the previously mentioned U.S. Pat. No. 4,109,738 to Kunz and therefore will be described only briefly. The fixed permanent magnet system 26 is threadably connected with the housing bottom 12 via four symmetrically arranged tubular columns 28 that receive the support bolts 30, respectively. In a hollow space defined within the permanent magnet system 26 is mounted a temperature-responsive resistance 27 which is electrically connected with the compensation current source 60. Regulator means 62 are controlled by the position sensing means 64, as is conventional in the art. Thus, the amount of current required to generate sufficient restoring force for returning the load receiver means to its initial no-load position is an indication of the load applied to the load receiving pan L.

Pivotally supported from the fixed permanent magnet means 26 by a pair of aligned elastic bending bearings 32 for pivotal movement about a horizontal pivot axis is a transmission lever 34. Connected with one end of the transmission lever for vertical displacement relative to the permanent magnet means 26 is the conventional electromagnetic compensation coil 36.

A parallel guidance system is provided for guiding the load support coupling member 40 for vertical displacement realtive to the housing 10, which guidance means includes a pair of triangular-shaped guide members 42 each of which has an apex portion connected with the coupling member 40 via the elastic bearing 44a, and a base portion connected with the stationary structure via a pair of elastic bearings 44b. In the upper end of the coupling member 40 is threadably fastened the conical pin 46 that is adapted to receive the scale pan L.

As shown in FIGS. 2 and 3, the coupling member 40 contains a vertical chamber 40a having a rear wall 48 containing an opening 50 for receiving a longitudinally extending end extension 34a of the transmission lever 34. The coupling member is open at its front to provide access to the chamber 40a, a removable front plate 52 being provided for closing the chamber. Preferably the front plate 52 is formed of a synthetic plastic material.

In the preferred example illustrated here (except for the permanent magnet system), essentially only the flexible bearings (32, 38, 44) are made of iron alloys. Most of the other components, in other words, for example, lever 34, guides 42, and coupling member 40, consist of aluminum alloys. Cover 52 can likewise be made of light metal but in most cases synthetic plastic materials (for example, polyamide) are better suited because of their low heat conduction capability. The above-mentioned raw material pairings, however, are not absolutely compulsory; when other working materials are selected, the placement of the flexible bearing 38 inside a hollow coupling member 40 is likewise advantageous in terms of the temperature performance.

Furthermore, it is preferable for the temperature performance of the scale in many cases to arrange the lever 34 as closely as possible to the permanent magnet system 26 and perhaps partly even inside that system (as shown by the aforementioned Kunz U.S. Pat. No. 4,184,556). In cases where the permanent magnet system 26 is attached to a separate carrier made of light metal, the lever 34 can practically be embedded with little interval in a correspondingly shaped recess in the carrier in order to achieve the most uniform possible heating (variant not illustrated).

While in accordance with the provisions of the Patent Statutes the preferred forms and embodiments have been illustrated and described, various changes and modifications may be made without deviating from the inventive concepts set forth above.

What is claimed is:

1. Weighing apparatus of the electromagnetic load compensation type, comprising
   (a) a housing (10);
   (b) permanent magnet means (26) connected with said housing;
   (c) load receiving means (46) connected for vertical movement relative to said housing, said load receiving means including a hollow coupling member (40) containing a vertical chamber (40a);
   (d) electromagnetic load compensation means including a compensation coil (36);
   (e) means connecting said coil for movement relative to said permanent magnet means in response to vertical displacement of said load receiver means relative to said housing, said connecting means including
      (1) a transmission lever (34) pivotally connected with said housing for movement about a horizontal pivot axis (32), said compensation coil being carried by said transmission lever, said transmission lever including a portion (34a) which extends through a wall opening contained in said coupling member; and
      (2) resilient bearing means (38) arranged vertically within said chamber for connecting said transmission lever portion with said coupling member.

2. Apparatus as defined in claim 1, wherein said coupling member includes a further wall opening affording access to said vertical chamber, and a removable cover member (52) connected with said coupling member to close said further wall opening.

3. Apparatus as defined in claim 2, wherein said cover member is formed of synthetic plastic material.

4. Apparatus as defined in claim 1, wherein said electromagnetic load compensation means includes a source of compensation current (60), and temperature-responsive resistance means (27) mounted adjacent said permanent magnet means for varying the magnitude of the compensation current supplied to said compensation coil.

5. Apparatus as defined in claim 4, wherein said housing includes partition wall means (20) defining in said housing at least two compartments (22, 24), said permanent magnet means and said temperature-responsive resistance means being arranged in one of said compartments; and further wherein said electromagnetic load compensation means comprises an electrical system including means affording a constant current source, load receiver position sensing means, and current regulating means, at least some of the electrical components of said system being arranged in another one of said compartments.

6. Apparatus as defined in claim 5, wherein said housing includes bottom and side walls, said partition wall means being integral with said bottom wall.

* * * * *